(12) United States Patent
Petrone et al.

(10) Patent No.: US 9,856,844 B2
(45) Date of Patent: Jan. 2, 2018

(54) FUEL PUMP FOR A DIRECT INJECTION SYSTEM WITH A BETTER HYDRAULIC SEALING OF THE INTAKE VALVE

(71) Applicant: MAGNETI MARELLI S.p.A., Corbetta (IT)

(72) Inventors: Michele Petrone, San Lazzaro di Savena (IT); Enrico Vezzani, Bologna (IT); Massimo Mattioli, Calderara di Reno (IT)

(73) Assignee: MAGNETI MARELLI S.p.A., Corbetta (IT)

( * ) Notice: Subject to any disclaimer, the term of this patent is extended or adjusted under 35 U.S.C. 154(b) by 120 days.

(21) Appl. No.: 15/139,542

(22) Filed: Apr. 27, 2016

(65) Prior Publication Data
US 2016/0319789 A1   Nov. 3, 2016

(30) Foreign Application Priority Data
Apr. 28, 2015   (IT) .............................. BO2015A0211

(51) Int. Cl.
*F02M 59/44* (2006.01)
*F02M 59/36* (2006.01)
(Continued)

(52) U.S. Cl.
CPC .......... *F02M 59/442* (2013.01); *F02M 59/02* (2013.01); *F02M 59/06* (2013.01);
(Continued)

(58) Field of Classification Search
CPC ...... F02M 59/462; F02M 59/20; F02M 59/02; F02M 63/0265; F02M 59/06;
(Continued)

(56) References Cited

U.S. PATENT DOCUMENTS 4,829,967 A * 5/1989 Nuti ........................ F01L 3/205
                                                      123/458
2004/0021011 A1* 2/2004 Ruthardt .............. F02M 47/027
                                                      239/533.11
(Continued)

FOREIGN PATENT DOCUMENTS

DE         19729791 A1    1/1999
DE     102009000859       8/2010
(Continued)

OTHER PUBLICATIONS

Search Report and Written Opinion issued by the Italian Patent Office for Italian Patent Application No. IT B020150211 dated Dec. 15, 2015.

*Primary Examiner* — Hung Q Nguyen
*Assistant Examiner* — Xiao Mo
(74) *Attorney, Agent, or Firm* — Howard & Howard Attorneys PLLC

(57) ABSTRACT

A fuel pump for a direct injection system having: a pumping chamber; a piston, which is mounted in a sliding manner on the inside of the pumping chamber; an intake channel, which originates from a wall of the pumping chamber and has a housing portion; an intake valve, which is inserted into the housing portion of the intake channel; and a locking ring nut with an annular shape, which is threaded and is screwed into the housing portion of the intake channel so as to strike against the intake valve; the housing portion has an annular abutment, which reduces the diameter of the housing portion and against which the intake valve strikes; the locking ring nut is screwed into the housing portion with a tightening force that is sufficient to determine a plastic deformation of the annular abutment against the intake valve.

9 Claims, 5 Drawing Sheets

(51) Int. Cl.

| | | |
|---|---|---|
| *F02M 63/02* | (2006.01) | |
| *F02M 59/06* | (2006.01) | |
| *F02M 59/10* | (2006.01) | |
| *F02M 59/02* | (2006.01) | |
| *F02M 59/20* | (2006.01) | |
| *F02M 59/46* | (2006.01) | |
| *F16K 1/32* | (2006.01) | |
| *F16K 31/06* | (2006.01) | |

(52) U.S. Cl.
CPC .......... *F02M 59/102* (2013.01); *F02M 59/20* (2013.01); *F02M 59/367* (2013.01); *F02M 59/462* (2013.01); *F02M 63/0265* (2013.01); *F16K 1/32* (2013.01); *F16K 31/06* (2013.01); *F02M 2200/16* (2013.01); *F02M 2200/26* (2013.01); *F02M 2200/8053* (2013.01); *F02M 2200/8061* (2013.01); *F02M 2200/8076* (2013.01)

(58) Field of Classification Search
CPC ............... F02M 59/102; F02M 59/367; F02M 2200/8076; F02M 2200/8061; F02M 2200/8053; F02M 2200/26; F02M 59/442; F02M 2200/16; F16K 31/06; F16K 1/32
See application file for complete search history.

(56) References Cited

U.S. PATENT DOCUMENTS

| | | | | |
|---|---|---|---|---|
| 2005/0079082 | A1* | 4/2005 | Olivieri | F02M 59/06 417/571 |
| 2010/0242922 | A1* | 9/2010 | Mancini | F02M 59/462 123/506 |
| 2014/0158797 | A1* | 6/2014 | Ricco | F02M 63/0031 239/585.1 |
| 2015/0107558 | A1* | 4/2015 | Dugad | F02M 37/0052 123/469 |
| 2016/0230725 | A1* | 8/2016 | Katsumata | F02M 55/02 |

FOREIGN PATENT DOCUMENTS

| | | |
|---|---|---|
| DE | 102013210019 A1 | 12/2014 |
| EP | 1724467 A1 | 11/2006 |
| EP | 2236809 A1 | 10/2010 |
| EP | 2508744 A1 | 10/2012 |
| IT | BO2014A000261 | 5/2014 |
| WO | 9902857 A2 | 1/1999 |

* cited by examiner

3
FUEL PUMP FOR A DIRECT INJECTION SYSTEM WITH A BETTER HYDRAULIC SEALING OF THE INTAKE VALVE

TECHNICAL FIELD

The invention relates to a fuel pump for a direct injection system; preferably, the direction injection system is used in a spark-ignition internal combustion engine, which, thus works with gasoline or similar fuels.

PRIOR ART

A direct-injection system comprises a plurality of injectors, a common rail, which feeds pressurized fuel to the injectors, a high-pressure pump, which feeds fuel to the common rail by means of a high-pressure feed line and is provided with a flow-rate adjusting device, and a control unit, which controls the flow-rate adjusting device so as to cause the fuel pressure on the inside of the common rail to be equal to a desired value, which normally varies in time as a function of the engine operating conditions.

The high pressure fuel pump described in patent application EP2236809A1 comprises a pumping chamber, in which a piston slides back and forth, an intake pipe regulated by an intake valve to feed low-pressure fuel to the pumping chamber, and a delivery pipe regulated by a delivery valve to feed high-pressure fuel from the pumping chamber along the feed line to the common rail.

The intake valve is normally pressure-controlled and, in the absence of external intervention, is closed when the fuel pressure in the pumping chamber is higher than the fuel pressure in intake channel, and is open when the fuel pressure in the pumping chamber is lower than the fuel pressure in intake channel. The flow-rate adjusting device is mechanically coupled to the intake valve so that, when necessary, the intake valve can be kept open during the piston pumping phase, thus allowing the fuel to flow out of the pumping chamber through the intake channel. In particular, the flow-rate adjusting device comprises a control rod, which is coupled to the intake valve and is movable between a passive position, in which it allows the intake valve to close, and an active position, in which it prevents the intake valve from closing. The flow-rate adjusting device comprises, furthermore, an electromagnetic actuator, which is coupled to the control rod so as to move it between the active position and the passive position. The electromagnetic actuator comprises a spring, which holds the control rod in the active position, and an electromagnet, which is designed to move the control rod to the passive position by magnetically attracting a ferromagnetic anchor, which is integral to the control rod, against a fixed magnetic armature.

Recently, car manufacturers have started designing new gasoline-operated internal combustion engines, which work with gasoline injection pressures that are greater than 400-500 bar (up to 800 bar) and, therefore, need high-pressure fuel pumps capable of pumping fuel at these pressures. However, the high-pressure fuel pump described in patent application EP2236809A1 is not capable of pumping fuel at such a high pressure. In particular, one of the most critical components of the high-pressure fuel pump, in terms of pressure increase, is the intake valve, which has a disc with a relatively large diameter, which is welded on the inside of the intake channel close the pumping chamber; as the pumping pressure increases, the hydraulic forces pressing on the disc of the intake valve increase as well and, thus, the disc potentially becomes subjected to detachments from the intake channel. In order to eliminate the risk of detachment of the disc from the intake valve of the intake channel, suggestions were made to improve the quality of the welding connecting the disc to the intake channel; however, this solution requires the use of complex and very expensive welding techniques. Furthermore, in order to eliminate the risk of detachment of the disc from the intake valve of the intake channel, suggestions were made to reduce the diameter of the disc; however, this solution increases the flow resistance of the fuel while flowing through the intake valve and worsens the dynamic performances of the intake valve.

In order to eliminate the risk of detachment of the disc from the intake valve of the intake channel, Italian patent application BO2014A000261 suggests the use of an annular-shaped locking ring nut, which is threaded and screwed into a housing portion of the intake valve, so as to strike against the intake valve itself. The use of a threaded locking ring nut, which is screwed so as to keep the intake valve in position, is also disclosed in the fuel pump described in patent application DE102009000859 and in the fuel pump described in patent application DE102013210019.

In the solution suggested by Italian patent application BO2014A000261, the hydraulic sealing of the intake valve is ensured by the close contact (obtained through mechanical interference by means of forced driving) between the disc of the intake valve and the housing portion of the intake channel; however, when the fuel pressure exceeds 600-700 bar, there can be problems with the hydraulic sealing of the intake valve, namely there can be fuel leakages when the intake valve is closed.

DESCRIPTION OF THE INVENTION

The object of the present invention is to provide a fuel pump for a direct injection system, which is capable of pumping fuel at a high pressure and, at the same time, is easy and cheap to be manufactured.

According to the present invention, there is provided a fuel pump for a direct injection system according to the appended claims.

BRIEF DESCRIPTION OF THE DRAWINGS

The present invention will now be described with reference to the accompanying drawings, which show a non-limiting embodiment thereof, wherein.

PREFERRED EMBODIMENTS OF THE INVENTION

Figure 1:
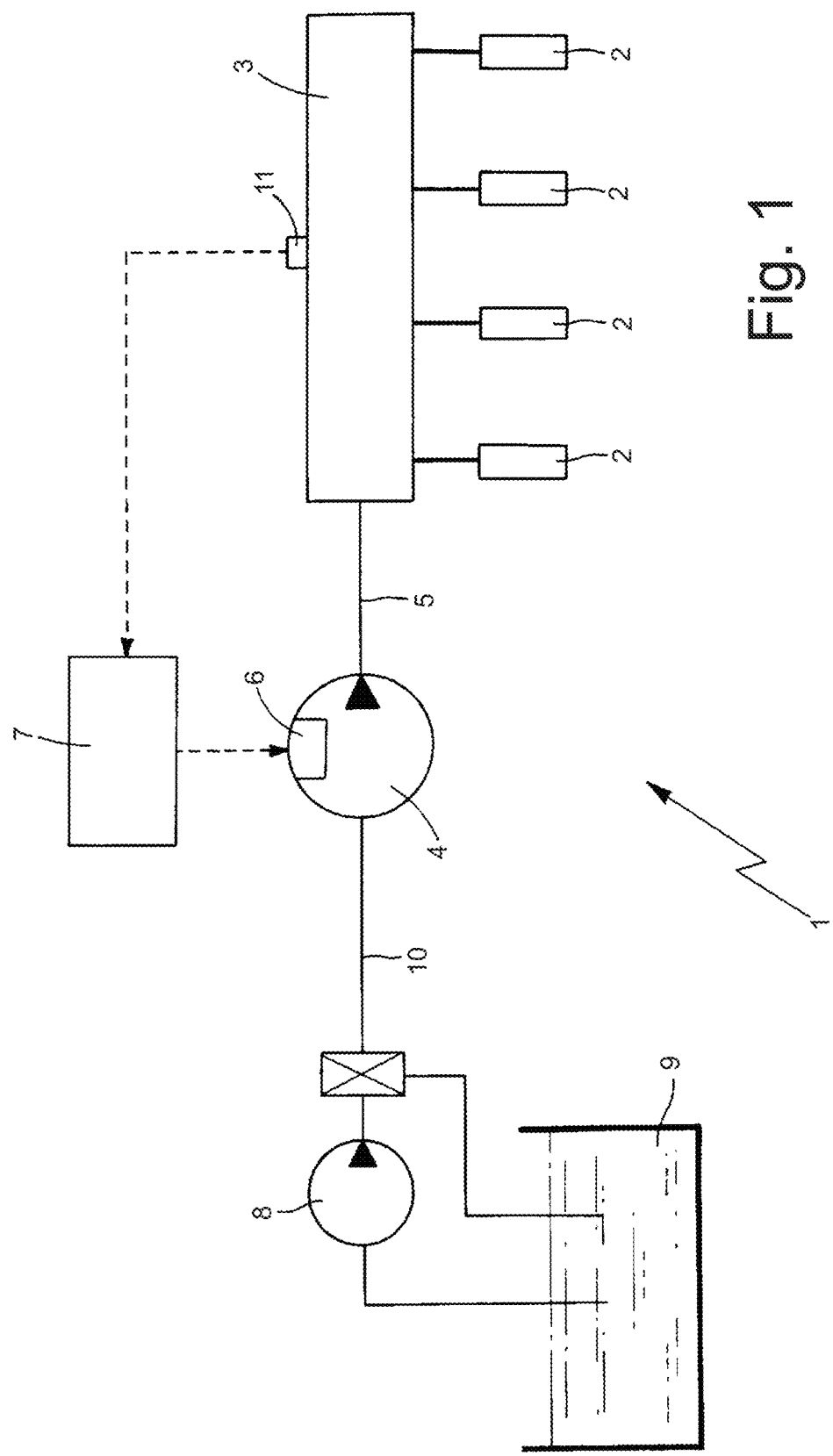
FIG. 1 is a schematic view, with some details removed for greater clarity, of a fuel direct injection system of the common rail type.

In FIG. 1, number 1 indicates, as a whole, a fuel direct-injection system of the common rail type for an internal combustion heat engine.

The direct injection system 1 comprises a plurality of injectors 2, a common rail 3, which feeds pressurized fuel to the injectors 2, a high-pressure pump 4, which feeds fuel to the common rail 3 by means of a feed line 5 and is provided with a flow-rate adjusting device 6, a control unit 7, which causes the fuel pressure on the inside of the common rail 3 to be equal to a desired value, which generally varies in time as a function of the engine operating conditions, and a low-pressure pump 8, which feeds fuel from a tank 9 to the high-pressure pump 4 by means of a feed line 10.

The control unit 7 is coupled to the flow-rate adjusting device 6 so as to control the flow-rate of the high-pressure pump 4, so that the common rail 3 is supplied, instant by instant, with the amount of fuel necessary to have the desired pressure value in the common rail 3; in particular, the control unit 7 regulates the flow-rate of the high-pressure pump 4 by means of a feedback control, which uses, as a feedback variable, the value of the fuel pressure on the inside of the common rail 3, the value of the pressure being detected, in real time, by a pressure sensor 11.

Figure 2:
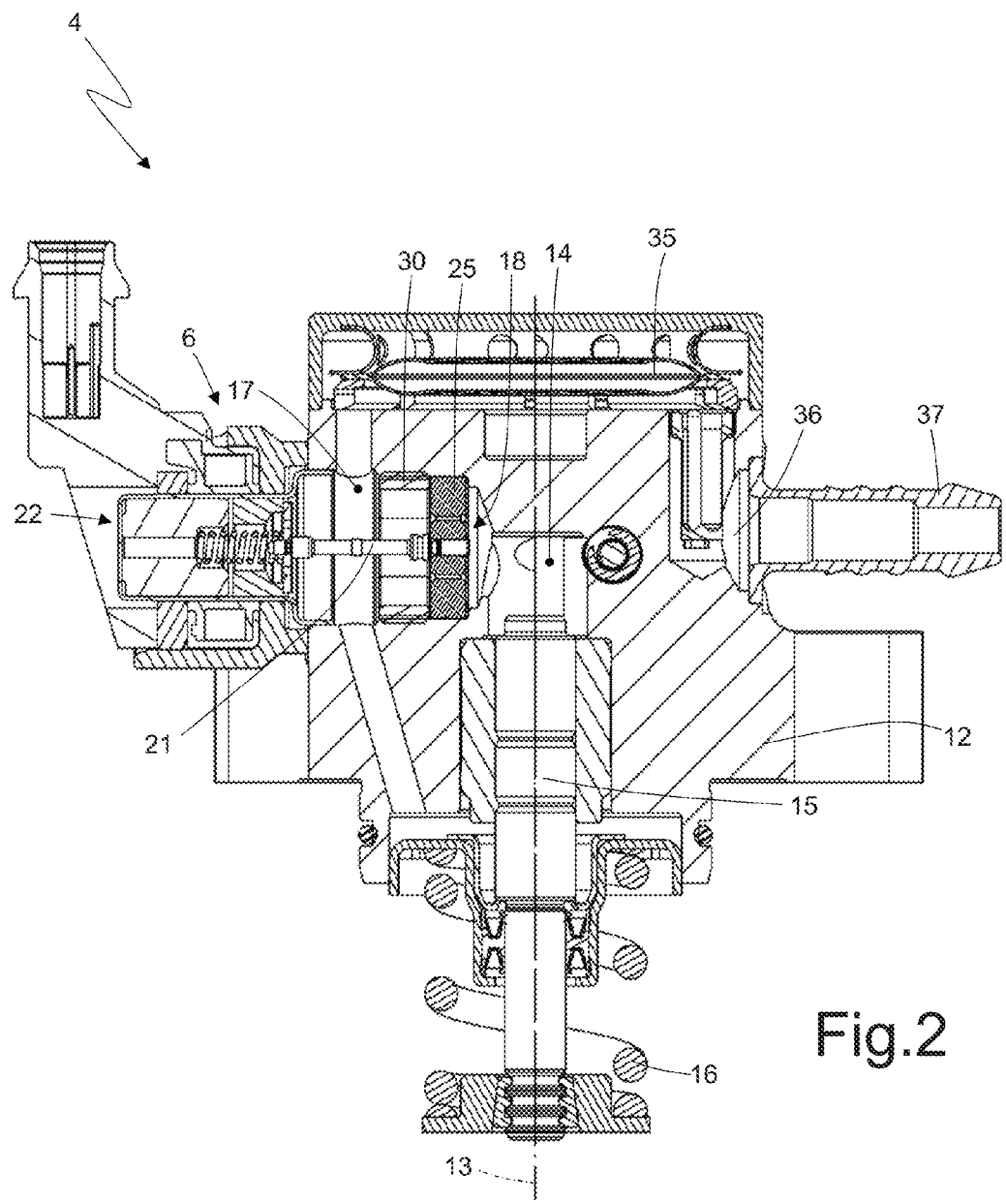
FIG. 2 is a longitudinal section view, namely a schematic view with some details removed for greater clarity, of a high-pressure fuel pump of the direct injection system of FIG. 1.

As shown in FIG. 2, the high-pressure pump 4 comprises a main body 12, which has a longitudinal axis 13 and defines, on the inside, a cylindrical pumping chamber 14. A piston 15 is mounted and slides on the inside of the pumping chamber 14, and, as it slides back and forth along the longitudinal axis 13, it determines a cyclical change in the volume of the pumping chamber 14. A lower portion of the piston 15, on one side, is coupled to a spring 16, which pushes the piston 15 towards a position producing a maximum volume of the pumping chamber 14, and, on the other side, is coupled to an eccentric (not shown), which is caused to rotate by a drive shaft of the engine so as to cyclically to move piston 15 upwards compressing the spring 16.

An intake channel 17 originates from a lateral wall of the pumping chamber 14, said intake channel 17 being connected to the low-pressure pump 8 by means of the feed line 10 and being regulated by an intake valve 18, which is arranged in the area of the pumping chamber 14. The intake valve 18 is normally pressure-controlled and, in the absence of external intervention, is closed when the fuel pressure in the pumping chamber 14 is higher than the fuel pressure in intake channel 17, and is open when the fuel pressure in the pumping chamber 14 is lower than the fuel pressure in intake channel 17.

Figure 3:
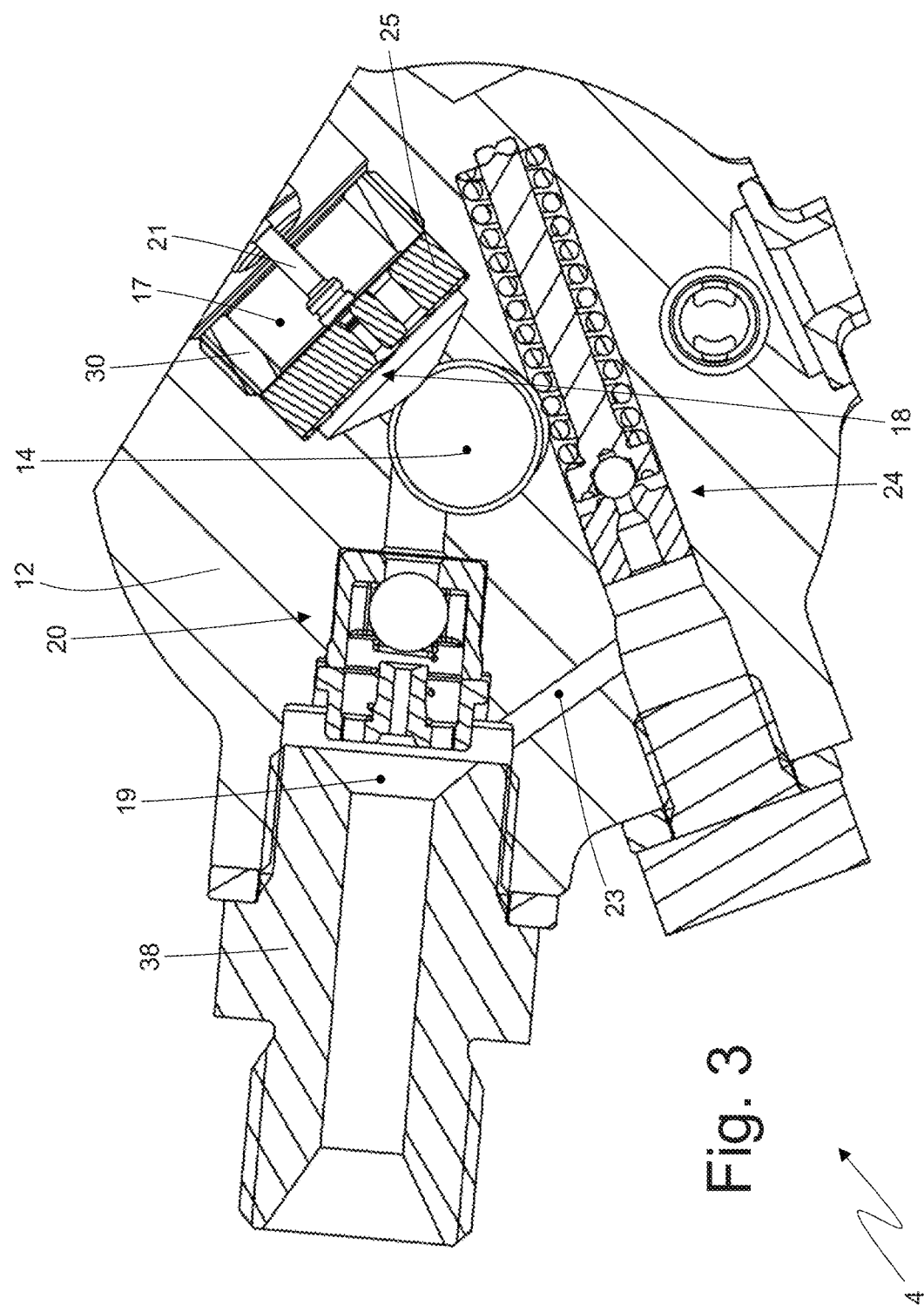
FIG. 3 is a cross section view, namely a schematic view with some details removed for greater clarity, of the high-pressure fuel pump of FIG. 2.

According to FIG. 3, a delivery channel 19 originates from a lateral wall of the pumping chamber 14 on the opposite side relative to the intake channel 17, said delivery channel 19 being connected to the common rail 3 by means of the feed line 5 and being regulated by a one-way delivery valve 20, which is arranged in the area of the pumping chamber 14 and only allows fuel to flow out of the pumping chamber 14. The delivery valve 20 is normally pressure-controlled and is open when the fuel pressure in the pumping chamber 14 is higher than the fuel pressure in delivery channel 19, and is closed when the fuel pressure in the pumping chamber 14 is lower than the fuel pressure in delivery channel 19.

According to FIG. 2, the flow-rate adjusting device 6 is mechanically coupled to the intake valve 18 so as to allow the control unit 7, when necessary, to keep the intake valve 18 open during a pumping phase of the piston 15, thus allowing the fuel to flow out of the pumping chamber 14 through the intake channel 17. The flow-rate adjusting device comprises a control rod 21, which is coupled to the intake valve 18 and is movable between a passive position, in which it allows the intake valve 18 to close, and an active position, in which it prevents the intake valve 18 from closing. The flow-rate adjusting device 6 comprises, furthermore, an electromagnetic actuator 22, which is coupled to the control rod 21 so as to move it between the active position and the passive position.

According to FIG. 3, a draining channel 23 originates from a lateral wall of the pumping chamber 14, said draining channel 23 establishing a communication between the pumping chamber 14 and the delivery channel 19 and being regulated by a one-way maximum-pressure valve 24, which only allows the fuel to flow into the pumping chamber 14. The function of the maximum-pressure valve 24 is that of enabling a fuel relief in case the pressure of the fuel in the common rail 3 exceeds a maximum value established during the designing phase (typically, in case of errors in the control carried out by the control unit 7); in other words, the maximum pressure valve 24 is calibrated to automatically open when the pressure drop at its ends is greater than a threshold value established in the designing phase, thus preventing the pressure of the fuel in the common rail 3 from exceeding the threshold value established in the designing phase.

Figure 4:
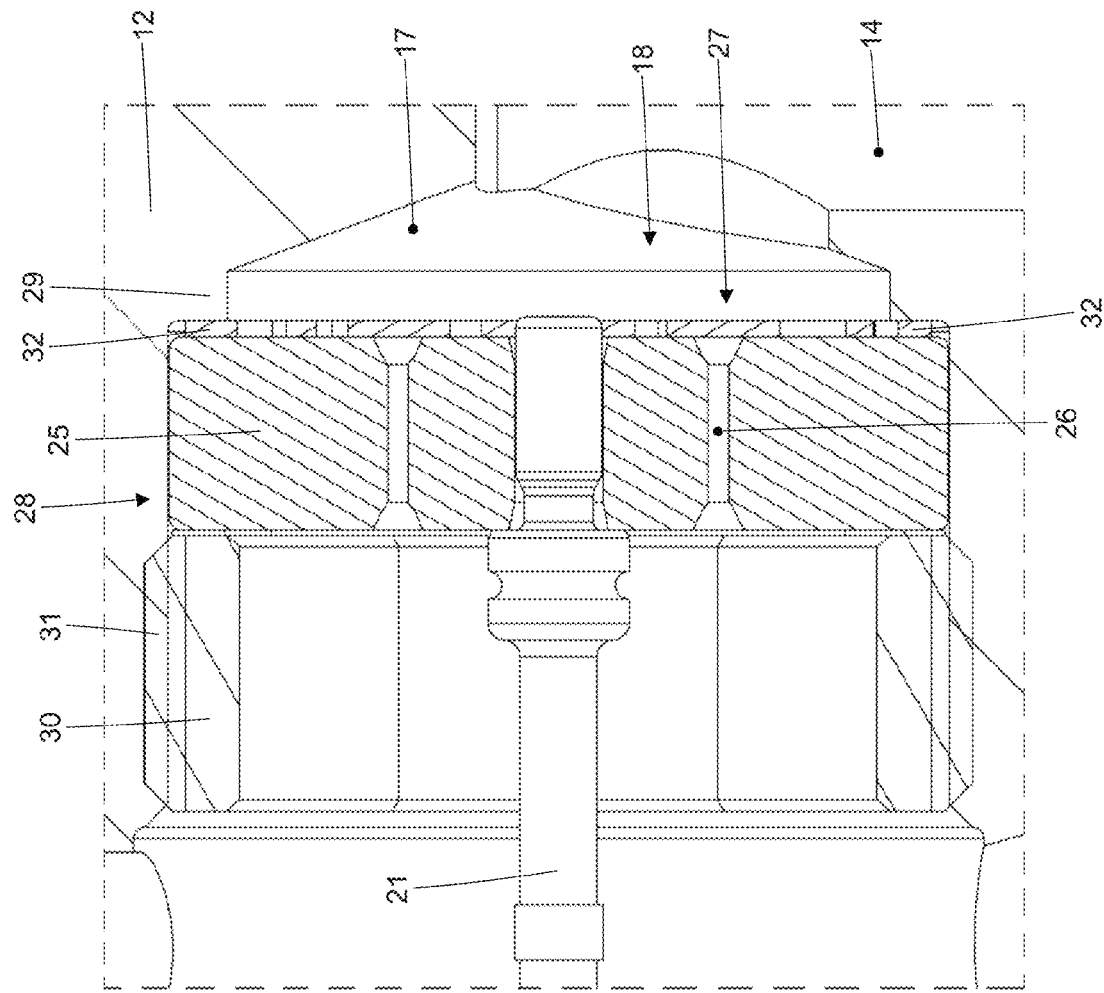
FIG. 4 is a view, on a larger scale, of a detail of FIG. 2 showing an intake valve.

According to FIG. 4, the intake valve 18 comprises a disc 25 having a series of feeding through holes 26, through which fuel can flow, and a flexible lamina 27 with a circular shape, which rests against a base of the disc 25, thus closing the passage through the feeding holes 26. The intake valve 18 is normally pressure-controlled and, in the absence of external intervention, is closed when the fuel pressure in the pumping chamber 14 is higher than the fuel pressure in intake channel 17, and is open when the fuel pressure in the pumping chamber 14 is lower than the fuel pressure in intake channel 17. In particular, when the fuel flows towards the pumping chamber 14, the lamina 27 deforms and moves away from the disc 25 under due to the thrust of the fuel, thus allowing the fuel to flow through the feeding holes 26; on the other hand, when the fuel flows from the pumping chamber 14, the lamina 27 is pressed against the disc 25, thus sealing the feeding holes 26 and, therefore, preventing the fuel from flowing through the feeding holes 26. In its active position, the control rod 21 pushes against the lamina 27 preventing the lamina 27 from adhering to the disc 25, thus preventing the lamina 27 from sealing the feeding holes 26.

The disc 25 of the intake valve 18 is inserted into the intake channel 17 close to the pumping chamber 14; in particular, the intake channel 17 has a housing portion 28, which is arranged (very) close to the pumping chamber 14 and is shaped so as to receive and house the disc 25 of the intake valve 18. In particular, the housing portion 28 has an annular abutment 29, which reduces the diameter of the housing portion 28 and against which the disc 25 of the intake valve 18 rests. In other words, an outer edge of the disc 25 of the intake valve 18 rests (namely strikes) against the annular abutment 29 of the housing portion 28 of the intake channel 17.

According to a preferred embodiment, the disc 25 of the intake valve 18 is driven into the housing portion 28 of the intake channel 17; namely, the disc 25 of the intake valve 18 is forced (forcedly pushed) and, therefore, partially deformed so as to get into the housing portion 28 of the intake channel 17 and strike against the annular abutment 29.

A locking ring nut 30 with an annular shape (namely centrally having a through hole for the passage of fuel) is provided, which is threaded (i.e. it has a thread 31 on the outside) and is screwed into the housing portion 28 of the intake channel 17 (obviously, the housing portion 28 has a thread as well, which corresponds to the thread 31 of the locking ring nut 30) until it strikes against the disc 25 of the intake valve 18 on the opposite side relative to the annular abutment 29 of the housing portion 28. In other words, the disc 25 of the intake valve 18 strikes, on one side, against the annular abutment 29 of the housing portion 28 and, on the opposite side, against the locking ring nut 30. Therefore, the presence of the locking ring nut 30 constraints the disc 25 of the intake valve 18 on the inside of the housing portion 28 of the intake channel 17, thus preventing the disc 25 itself from carrying out any movement relative to the housing portion 28 of the intake channel 17.

Figure 5:
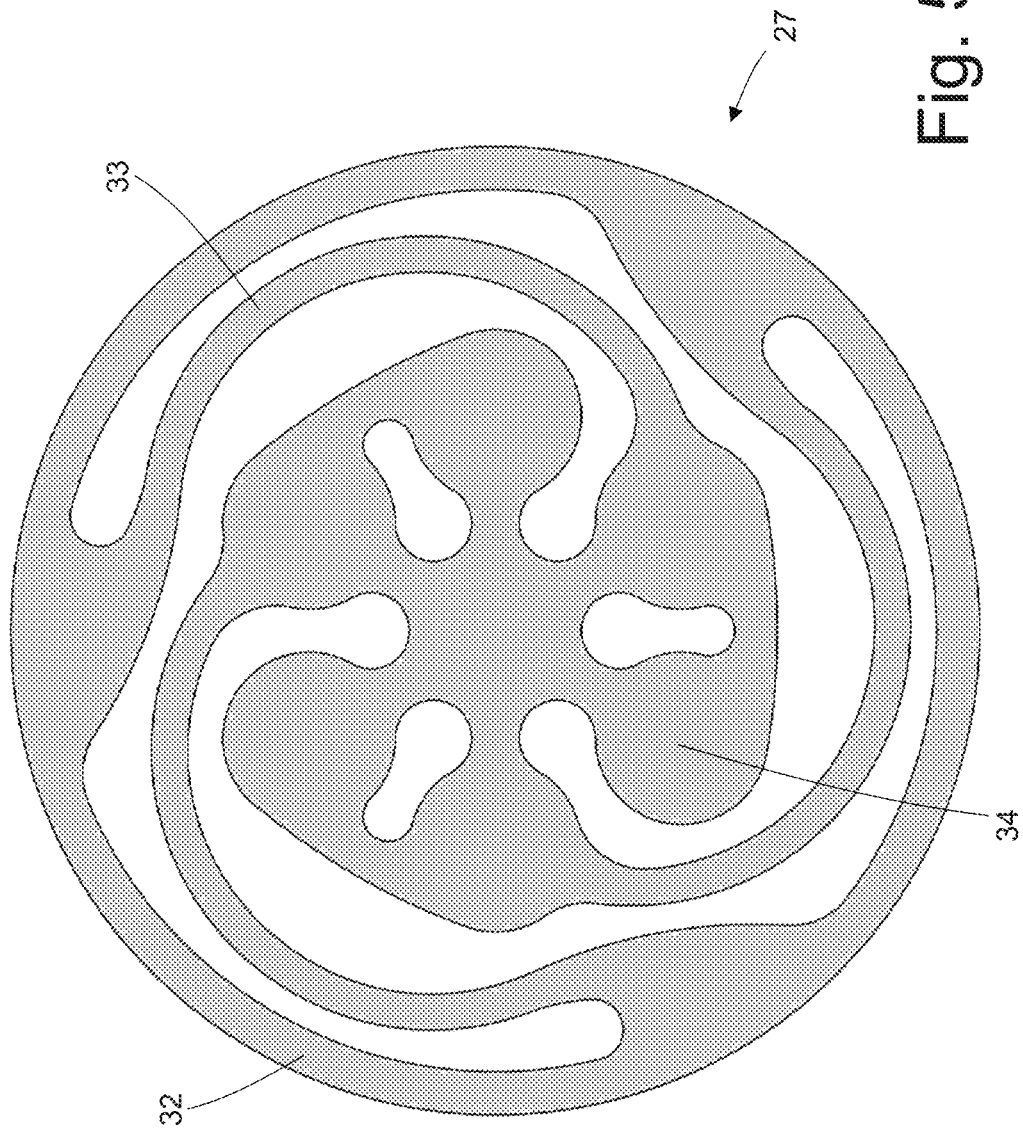
FIG. 5 is a plan view of a deformable lamina of the intake valve of FIG. 4.

According to FIG. 5, the flexible lamina 27 comprises an outer edge 32 with a circular shape, from which three thin stems 33 originate, which support a shutter body 34 arranged centrally. The shutter body 34 has six circular shutting zones, each arranged in the area of a feeding hole 26; the six circular shutting zones are arranged around a central element of the shutter body 34, on which the control rod 21 rests.

For a correct operation of the fuel pump 4, it is necessary to ensure the hydraulic sealing of the intake valve 18, which means that one should avoid fuel leakages between the outer surface of the disc 25 of the intake valve 18 and the inner surface of the housing portion 28 of the intake channel 17 when the intake valve 18 is closed; the hydraulic sealing of the intake valve 18 is ensured in the area of the annular abutment 29 of the housing portion 28 through the contact between the outer edge 32 of the flexible lamina 27 and the annular abutment 29.

In order to obtain the necessary hydraulic sealing, the locking ring nut 30 is tightened (screwed) with a tightening force that is sufficient to obtain a plastic deformation of the annular abutment 29 due to the thrust of the outer edge 32 of the flexible lamina 27, thus determining a perfect contact (i.e. without slits, even small ones) between the outer edge 32 of the flexible lamina 27 and the annular abutment 29. In other words, when the annular abutment 29 plastically deforms around the outer edge 32 of the flexible lamina 27, there is a perfect contact (i.e. without slits, even small ones) between the annular abutment 29 and the outer edge 32 of the flexible lamina 27; in this way, an optimal hydraulic sealing is obtained, which is capable of resisting, without leakages of any type, to very high fuel pressures (even higher than 1000 bar).

Preferably, the flexible lamina 27 is made of a metal material having a greater hardness than the metal material of which the annular abutment 29 is made (namely, than the material making up the main body 12 where the intake channel 17 is obtained, which has the housing portion 28 and along which the annular abutment 29 is located); in this way, the thrust of the locking ring nut 39 plastically deforms the annular abutment 29 and not (significantly) the outer edge 32 of the flexible lamina 27 (thus avoiding interferences with the correct operation of the flexible lamina 27, which constitutes the active part of the intake valve 18).

The locking ring nut 30 exerts an axial compression upon the disc 25 of the intake valve 18, which is originated by the tightening force with which the locking ring nut 30 has been screwed in the housing portion 28 and is released onto the annular abutment 29 through the outer edge 32 of the flexible lamina 27, which is interposed between the disc 25 of the intake valve 18 and the annular abutment 29. In order to make sure that the annular abutment 29 deforms around the outer edge 32 of the flexible lamina 27, it is necessary for the pressure exerted by the outer edge 32 of the flexible lamina 27 upon the annular abutment 29 to overcome the deformation resistance of the annular abutment 29 itself (this means that the pressure should approximately range between 900 and 1100 $N/mm^2$); for this reason, it is necessary, on the one hand, that the tightening force with which the locking ring nut 30 is screwed in the housing portion 28 is sufficiently high (by way of example, the locking ring nut 30 can be tightened with a torque of approximately 80-100 Nm) and, on the other hand, that the overall contact surface between the outer edge 32 of the flexible lamina 27 and the annular abutment 29 is sufficiently small. Therefore, manufacturers need to properly choose the right metal material for the annular abutment 29, the right tightening force to screw the locking ring nut 30 in the housing portion 28, and the right size (contact area) of the outer edge 32 of the flexible lamina 27.

Furthermore, the disc 25 of the intake valve 18 should be made of a metal material having a greater hardness than the metal material of which the annular abutment 29 is made; in this way, the thrust of the locking ring nut 30 only deforms the annular abutment 29 (which means that it does not deform the disc 25 of the intake vale 18), thus concentrating the deformations only where they are needed, namely where they allow manufacturers to obtain an optimal hydraulic sealing.

When the locking ring nut 30 is screwed, the rotation of the locking ring nut 30 should preferably be prevented from also determining a corresponding rotation of the disc 25 of the intake valve 18, since the rotation of the disc 25 of the intake valve 18 causes the outer edge 32 of the flexible lamina 27 to slide on the annular abutment 29 and this sliding movement determines a worse contact (and, therefore, a reduced sealing) between the outer edge 32 of the flexible lamina 27 and the annular abutment 29. In order to prevent the screwing movement of the locking ring nut 30 from also determining a corresponding rotation of the disc 25 of the intake valve 18, the disc 25 of the intake valve 18 can be driven into the housing portion 28 of the intake channel 17 before inserting the locking ring nut 30; in this way, the force generated by the driving of the disc 25 of the intake valve 28 into the housing portion 28 of the intake channel 17 is sufficient to avoid rotations of the disc 25 of the intake valve 18. As an alternative or in addition thereto, in order to prevent the screwing movement of the locking ring nut 30 from also determining a corresponding rotation of the disc 25 of the intake valve 18, an intermediate element, acting as a bearing, can be interposed between the locking ring nut 30 and the disc 25 of the intake valve 18; in this way, the tightening torque exerted upon the locking ring nut 30 is not transmitted to the disc 25 of the intake valve 18, as it is stopped by the intermediate element.

In the embodiment described above, the hydraulic sealing of intake valve 18 is ensured by the deformation of the annular abutment 29 against the intake valve 18 (namely, the annular abutment 29 is softer than the intake valve 18 and, therefore, it deforms due to the thrust of the intake valve 18); according to a different embodiment (which is not part of the subject-matter of the present invention), the hydraulic sealing of the intake valve 18 is ensured by the deformation of the intake valve 18 against the annular abutment 29 (namely, the intake valve 18 is softer than the annular abutment 29 and, therefore, it deforms when it is pushed against the annular abutment 29).

The hydraulic sealing of the intake valve 18 is ensured by the deformation of the annular abutment 29 around the outer edge 32 of the flexible lamina 27. On the other hand, the mechanical sealing of the intake valve 18 is ensured by the presence of the locking ring nut 30, which, as it is screwed on the inside of the housing portion 28 of the intake channel 17, guarantees a high mechanical resistance. As a consequence, there is a separation between the hydraulic sealing function (which is fulfilled by the deformation between the annular abutment 29 and the outer edge 32 of the flexible lamina 27) and the mechanical sealing function (which is fulfilled by the action of the locking ring nut 30). In this way, you can obtain, at the same time, both a good hydraulic sealing and a good mechanical sealing, even though in the presence of a simple and cheap structure.

According to FIG. 2, the intake channel 17 connects the feeding duct 10 to the pumping chamber 14, is regulated by the intake valve 18 (arranged in the area of the pumping chamber 14), and partially develops on the inside of the main body 12. Along the intake channel 17 (downstream of the intake valve 18) there is arranged a dampening device 35 (compensator), which fulfils the function of reducing, in the low-pressure branch (i.e. along the feeding duct 10), the extent of the pulsations of the fuel flow rate and, therefore, the extent of the oscillations of the fuel pressure. Preferably, the dampening device 35 is inserted into a chamber that is delimited, on the inside, by a surface of the main body and, on the outside, by a lid fixed to the main body 12.

A filter 36 is arranged downstream of the dampening device 35 in the area of a tubular body 37 on which an end of the feeding duct 10 is fitted.

According to FIG. 3, the main body 12 is coupled to a tubular body 38, which builds a continuation of the delivery channel 19 and is suited to be connected to the feeding duct 5. According to a preferred embodiment, the tubular body 38 is screwed into the main body 12; in this way, the coupling between the tubular body 38 and the main body 12 has a greater mechanical resistance. Furthermore, the feeding duct 5 is screwed on the outside of the tubular body 38; in this way, the coupling between the tubular body 38 and the feeding duct 5 has a greater mechanical resistance.

According to a preferred embodiment shown in FIG. 3, the intake pipe 17 and the delivery pipe 19 are not parallel to one another and not aligned in the area of the pumping chamber 14; namely, in the area of the pumping chamber 14, the intake pipe 17 forms an obtuse angle with the delivery pipe 19. This feature is particularly important, since it makes sure that the exhaust pipe 23 has more room, without jeopardizing in any way the intake valve 18 and the delivery valve 20.

The high-pressure pump 4 described above has numerous advantages.

First of all, the high-pressure pump 4 described above is capable of pumping fuel at a pressure higher than 600-700 bar. Among other things, this result is obtained thanks to the fact that the intake valve 18 is inserted into the intake pipe 17 in ways that ensure both a high hydraulic sealing and a high mechanical sealing. In particular, the hydraulic sealing is ensured, in a very easy and safe manner, by carrying out a deformation of the annular abutment 29 around the outer edge 32 of the flexible lamina 27.

Furthermore, the high-pressure pump 4 described above is simple and cheap to be manufactured, as the deformation of the annular abutment 29 around the outer edge 32 of the flexible lamina 27 can be obtained without additional components, but only with a proper sizing of the parts involved.

The invention claimed is:

1. A fuel pump (4) for a direct injection system (1) provided with a common rail (3); the fuel pump (4) comprises:

a pumping chamber (14) defined in a main body (12);
a piston (15), which is mounted in a sliding manner on the inside of the pumping chamber (14) so as to cyclically vary the volume of the pumping chamber (14);
an intake channel (17), which originates from a wall of the pumping chamber (14) and has a housing portion (28), which is arranged in the area of the pumping chamber (14);
an intake valve (18), which is inserted into the housing portion (28) of the intake channel (17);
a delivery channel (19), which originates from a wall of the pumping chamber (14);
a delivery valve (20), which is arranged along the delivery channel (19) in the area of the pumping chamber (14);
a locking ring nut (30) with an annular shape, which is threaded and is screwed into the housing portion (28) of the intake channel (17) so as to strike against the intake valve (18);
wherein the housing portion (28) of the intake channel (17) has an annular abutment (29), which reduces the diameter of the housing portion (28) and against which the intake valve (18) strikes;
the fuel pump (4) is characterized in that:
the intake valve (18) is made of a metal material having a greater hardness than the metal material of which the annular abutment (29) is made; and
the locking ring nut (30) is screwed into the housing portion (28) of the intake channel (17) with a tightening force that is sufficient to determine a plastic deformation of the annular abutment (29) against the intake valve (18).

2. A fuel pump (4) according to claim 1, wherein:
the intake valve (18) comprises a disc (25) having a series of feeding through holes (26), through which fuel can flow, and a flexible lamina (27), which rests against a base of the disc (25), thus closing the passage through the feeding holes (26); and
the flexible lamina (27) comprising an outer edge (32) with a circular shape, which rests against the annular abutment (29), thus determining the plastic deformation of the annular abutment (29).

3. A fuel pump (4) according to claim 2, wherein the flexible lamina (27) is made of a metal material having a greater hardness than the metal material of which the annular abutment (29) is made.

4. A fuel pump (4) according to claim 2, wherein the disc (25) of the intake valve (18) is made of a metal material having a greater hardness than the metal material of which the annular abutment (29) is made.

5. A fuel pump according to claim 2, wherein the flexible lamina (27) comprises a series of thin stems (33), which originate from the outer edge (32); and a shutter body (34), which is supported by the stems (33).

6. A fuel pump (4) according to claim 1, wherein an intermediate element, which acts as a bearing, is interposed between the locking ring nut (30) and the intake valve (18).

7. A fuel pump (4) according to claim 1, wherein the intake valve (18) is driven into the housing portion (28) of the intake channel (17).

8. A fuel pump (4) according to claim 1, wherein the locking ring nut (30) strikes against the intake valve (18) on the opposite side relative to the annular abutment (29).

9. A fuel pump (4) according to claim 1, wherein the intake valve (18) strikes, on one side, against the annular abutment (29) of the housing portion (28) and, on the opposite side, against the locking ring nut (30).

* * * * *